United States Patent

[11] 3,609,198

| [72] | Inventors | Kazuo Yamagishi<br>Tokyo;<br>Osamu Kageyama, Iruma-gun, Saitama;<br>Hideo Arai, Iruma-gun, Saitama; Hideaki<br>Masaki, Ohtake-shi, all of Japan |
|------|-----------|---|
| [21] | Appl. No. | 788,360 |
| [22] | Filed | Jan. 2, 1969 |
| [45] | Patented | Sept. 28, 1971 |
| [73] | Assignee | Daicel Ltd.<br>Osaka, Japan |
| [32] | Priority | Feb. 14, 1968 |
| [33] | | Japan |
| [31] | | 43/9265 |

[54] PROCESS FOR THE CONTINUOUS MANUFACTURE OF GLYCERIN BY SIMULTANEOUS REACTION AND WATER-ADDITION AZEOTROPIC DISTILLATION
7 Claims, 1 Drawing Fig.

[52] U.S. Cl. .................................. 260/635 H,
203/92, 203/96, 203/DIG. 6
[51] Int. Cl. .................................. B01d 3/36,
C07c 31/22
[50] Field of Search .................................. 203/96, 60,
18, 14, DIG. 6, 95, 97, 92, 93; 260/635 H, 635 E;
202/158

[56] References Cited
UNITED STATES PATENTS

| 2,081,322 | 5/1937 | Carney | 203/DIG. 6 |
| 2,838,575 | 6/1958 | Smith | 260/635 H |
| 3,366,457 | 1/1968 | Hunter | 203/DIG. 6 |
| 3,454,655 | 7/1969 | Liao | 260/635 H |

FOREIGN PATENTS

| 917,747 | 2/1963 | Great Britain | 260/635 H |

*Primary Examiner*—Wilbur L. Bascomb, Jr.
*Attorney*—Woodhams, Blanchard and Flynn

ABSTRACT: A process for producing glycerin by a reaction between peracetic acid and allyl alcohol, without using a catalyst, in which a lower fatty acid ester solution of peracetic acid and allyl alcohol are fed into a distillation column and water is fed into the distillation column at a higher position so that an azeotropic mixture of the lower fatty acid ester and water is removed from the top of the column and an aqueous solution of glycerin is removed from the bottom of the column.

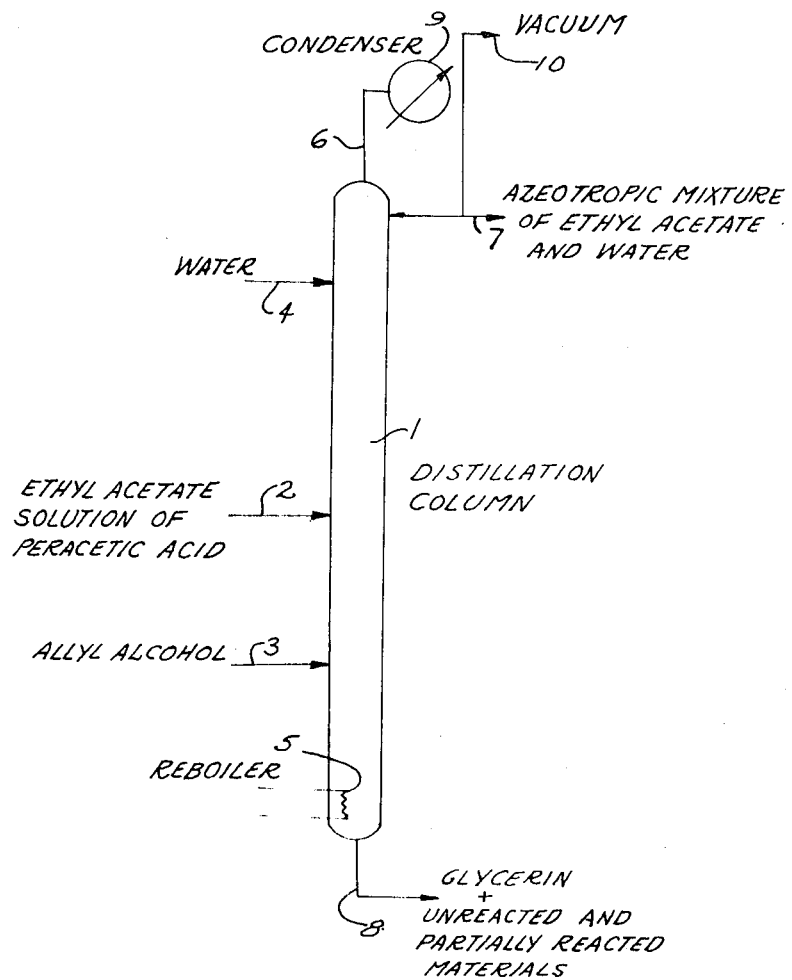

3,609,198

PROCESS FOR THE CONTINUOUS MANUFACTURE OF GLYCERIN BY SIMULTANEOUS REACTION AND WATER-ADDITION AZEOTROPIC DISTILLATION

BACKGROUND OF THE INVENTION

1. Field of the Invention

This invention relates to a process for producing glycerin from peracetic acid and allyl alcohol.

2. Description of the Prior Art

It is known from British Pat. No. 917,747 that glycerin is produced through glycidol obtained by the reaction of peracetic acid and allyl alcohol in the absence of catalysts in an acidic aqueous solution. The peracetic acid to be used in the reaction is obtained industrially by oxidating acetaldehyde in the presence of an organic solvent or oxidating acetic acid with hydrogen peroxide. However, peracetic acid is quite unstable and it is considered to be very difficult to concentrate it to a high concentration. Therefore, peracetic acid is usually obtained as an organic solvent solution containing about 10 to 50 percent by weight peracetic acid and containing a small amount of acetic acid, etc. Therefore, it will be easily understood that, when glycerin is produced by making peracetic acid and allyl alcohol react with each other in an acidic aqueous solution as mentioned above, it will be convenient and practical to make peracetic acid react with allyl alcohol in the state of an aqueous solution by adding a large amount of water to an organic solvent solution of peracetic acid obtained as described above.

Generally, as an organic solvent for dissolving peracetic acid, there is mainly used a lower fatty acid ester, such as ethyl acetate or methyl acetate. However, in the production of glycerin, when a lower fatty acid ester solution of peracetic acid and allyl alcohol are made to react with each other in the presence of a large amount of water, the reaction solution will stay in the reaction zone as an acidic aqueous solution for a considerable time at its reaction temperature of 50° to 7° C. Therefore, there will be disadvantages, such that not only about 10 percent of the lower fatty acid ester in the reaction solution will be hydrolyzed and lost, but also the alcohol produced by the hydrolysis will make an azeotropic mixture with the above-mentioned ester to make the subsequent separation and purification operations more difficult. Therefore, in order to avoid such disadvantages, it is thought desirable to obtain an aqueous solution of peracetic acid by recovering the above-mentioned ester by distilling, at a comparatively low temperature, the lower fatty acid ester solution of peracetic acid in advance while adding water to it and to use this aqueous solution for the reaction of producing glycerin. However, in such a case, at the distilling temperature which can be industrially advantageously established to distill away the lower fatty acid ester, the peracetic acid will decompose to produce hydrogen peroxide. Further, the hydrogen peroxide in the thus obtained aqueous solution of peracetic acid will not substantially react with allyl alcohol in the glycidol producing reaction without using a catalyst. Therefore, such a process will be very disadvantageous in respect of the loss of peracetic acid.

SUMMARY OF THE INVENTION

We have studied the process for producing glycerin by reacting peracetic acid, which is obtained as a solution in a lower fatty acid ester, with allyl alcohol, without using a catalyst, in an acidic aqueous solution in order to establish an industrially advantageous process which will not have such disadvantages of the prior art methods as are described above. We have found a very remarkable fact that, when no catalyst is used, the reaction of peracetic acid and allyl alcohol is more rapid than is the reaction in which peracetic acid changes to hydrogen peroxide. For example, under the conditions that the mol ratio of peracetic acid: allyl alcohol: water is 1:1:30 and the temperature is 60° C., the initial reaction rate of peracetic acid and allyl alcohol to produce glycidol is about 600 times as high as the initial reaction rate of peracetic acid and water to produce hydrogen peroxide.

On the basis of this discovery, we have devised a new process for producing glycerin which can be termed a "reaction-distillation process" as described below.

According to the process of the present invention, in order to produce glycerin continuously from peracetic acid and allyl alcohol, a lower fatty acid ester solution of peracetic acid and allyl alcohol are fed continuously into a distillation column, respectively, while water is also continuously fed into the column at a higher position than the feeding positions of said peracetic acid solution and said allyl alcohol. An azeotropic mixture of the lower fatty acid ester and water will be distilled out from the top of the column continuously, while the peracetic acid and allyl alcohol will be made to react with each other in the absence of a catalyst for producing glycidol, which will be immediately converted to glycerin by hydration due to the water present in the system. The glycerin will be taken out at the bottom of the distillation column.

The present invention shall be further explained in the following description with reference to the accompanying drawing, which diagrammatically shows a reaction-distillation column used for carrying out the process of the present invention.

DESCRIPTION OF A PREFERRED EMBODIMENT

In the drawing, an ethyl acetate solution of peracetic acid is fed into a reaction and distillation column 1 at a substantially middle tray or step 2 of the column 1. Allyl alcohol is fed into the column 1 at the same vertical position 2 or, preferably at a lower position 3 that is one to 10 steps below the position 2. At the same time, water is fed into the column 1 at a higher position 4 which is 10 to 20 steps above the feeding points 2 and 3. The contents of the column are heated with a reboiler 5 provided in the bottom of the column 1 so that a reaction may take place simultaneously with the distillation. Thus, within the column, the greater part of the ethyl acetate that is fed into the column with the peracetic acid will rise in the vapor phase, through the column according to its boiling point temperature and will form an azeotropic mixture with a part of the water flowing down from the upper part of the column. The azeotropic mixture thus formed will be distilled out from the upper end 6 of the column and it will be taken out of the system at 7, while a part thereof is refluxed. 9 indicates a condenser and 10 indicates a vacuum source connection. The peracetic acid thus separated from the ethyl acetate will come into contact, concurrently or countercurrently, on the trays with the allyl alcohol of a relatively low boiling point fed into the column 1 at the same position 2 or at the lower step 3 of the column. This will produce glycidol by reaction at the selected reaction temperature in the presence of water which is flowing downwardly. At the same time, the greater part of the glycidol will be immediately hydrated to form glycerin. The glycerin thus formed will flow down through the tower together with the unreacted allyl alcohol and the aqueous extract of the peracetic acid which are extracted by the water flowing down from the upper steps, and will be taken out through the bottom 8 of the column as a bottom product.

In this process, it is necessary that the reaction temperature be maintained in a range in which the desired reaction can proceed effectively and at the same time the occurrence of decomposition of the peracetic acid and other secondary reactions can be effectively inhibited. Accordingly, the reaction zone below the feeding position 2 of the peracetic acid solution preferably should be maintained at a temperature of 30° to 90° C., or more preferably 45° to 70° C. Further, it is preferable to maintain the inside of the tower at a reduced pressure, depending on the kind of the distilling column used, so that the ethyl acetate-water azeotropic mixture may be efficiently distilled out of the top of the distilling column at said reaction temperature.

The aqueous solution obtained as the bottom product by the above reaction still contains some unreacted materials and unhydrated glycidol. Therefore, in order to finally complete the reaction to obtain the maximum amount of glycerin, the aqueous solution should be treated by passing through a series of reactors (usually one or two), and by adding additional allyl alcohol, if necessary. Such aftertreatment for the completion of the reaction may be otherwise carried out in the appropriate manner so long as an aging temperature of 60° to 70° C. is maintained.

In the above process according to the present invention, the reaction of peracetic acid and allyl alcohol can be carried out in the substantial absence of ethyl acetate or in the presence of only a very small amount thereof, because the ethyl acetate will not remain to any substantial extent in the acidic reaction zone below the feeding position 2 of the ethyl acetate solution of peracetic acid in which acetic acid and peracetic acid are present. Rather, the ethyl acetate will be distilled out directly from the top of the distilling column and, therefore, the ethyl acetate will not be hydrolyzed. Further, in the operation of the above process, it will be very effective to provide the feeding position of the allyl alcohol into the distillation column at more than several steps below the feeding position of the ethyl acetate solution of peracetic acid in order to avoid contact of the ethyl acetate with the acidic reaction solution in the zone at the reaction temperature. However, even when allyl alcohol is fed in at the same position or at about one step above the peracetic acid feeding position, the ethyl acetate will be separated within a relatively short period of time and will rise through the distillation column. Therefore, the hydrolysis of ethyl acetate will be substantially inhibited. Further, in the above-mentioned process, the reaction of peracetic acid with allyl alcohol and water is carried out in the substantial absence of ethyl acetate and, since the reaction of peracetic acid with allyl alcohol to form glycidol is more rapid than the decomposing reaction of peracetic acid to form hydrogen peroxide, it is possible to effectively carry out the hydroxylating reaction while inhibiting the byproduction of hydrogen peroxide. In summary, according to process of the present invention, a lower fatty acid ester solution of peracetic acid, which can be obtained industrially, can be successfully used without the disadvantages of the production of hydrogen peroxide and the hydrolysis of said lower fatty acid ester.

As the organic solvent solution of the peracetic acid to be used in the process of the present invention there can be used not only the above-described solution of ethyl acetate, but also a lower fatty acid ester solution of methyl acetate or the like. For purposes of convenient operation, its concentration should be about 10 to 50 percent, preferably 30 to 40 percent by weight, but this range is not critical, because any concentration at which the reaction and distillation can be carried out safely and economically can be used. The amount of allyl alcohol used is preferably in the range of about 1 to about 1.5 mols to 1 mol of peracetic acid, if the rate of conversion of peracetic acid is taken into consideration. But, even when there is used from about 0.5 to 1.0 mols of allyl alcohol to 1 mol of peracetic acid, so long as the recovery and reuse of the unreacted peracetic acid can be carried appropriately, it will be possible to carry out the distillation reaction process of the present invention so as to accomplish the purpose of the invention. Water is an essential material which is indispensable in order to carry out the hydrating reaction of the produced glycidol. It is also necessary in order to control the concentrations of peracetic acid and allyl alcohol in the aqueous solution, thus making it possible for the reaction in said aqueous solution to proceed smoothly and to take out the unreacted peracetic acid and allyl alcohol contained in the bottom product without distilling them out from the top of the tower. Accordingly, water is generally added in an amount of from about 10 to about 100 mols, preferably 30 to 50 mols, to 1 mol of the peracetic acid. The amount of water used should be selected in the above range and should be above the amount required to accomplish the above necessary functions but below the upper limit because the use of an excess brings about an economic disadvantage in the subsequent treatment.

In carrying out the present invention, the feeding positions of the respective starting materials into the reaction-distillation column are important in order to accomplish the purpose of the present invention effectively. For the already described reasons, the solvent solution of peracetic acid and the allyl alcohol are fed in at substantially the middle step of the distillation column and, preferably, the allyl alcohol is fed in at a position one to 10 steps below the middle step plate, at which the peracetic acid solution is fed in. Water is fed in above the feeding positions of the peracetic acid solution and the allyl alcohol preferably at about 10 to 20 steps above the middle step. Particularly, in order to effectively separate the ethyl acetate and to effectively accomplish the above-mentioned functions of the water, it is desirable to avoid feeding in the water at a position too close to the positions of feeding in the peracetic acid and the allyl alcohol.

Thus, the present invention provides a process for producing glycerin continuously at a high yield by carrying out a reaction simultaneously with a distillation by feeding the respective starting materials into a distillation column so as to utilize the properties of the respective starting materials very ingeniously whereby such disadvantages as the decomposition of the lower fatty acid ester used as a solvent for the peracetic acid and the production of hydrogen peroxide do not occur.

The invention will be further described with reference to the following illustrative examples. (The parts and percent in the examples are by weight unless otherwise stated.)

EXAMPLE 1

In a distillation column having 25 column steps, a reaction and distillation were carried out at a reflux ratio of 1 under a reduced pressure of 150 mm./Hg at the top of the column by continuously feeding (1) 23.1 parts/hr. of allyl alcohol to the second step plate from the bottom, (2) 84.0 parts/hr. of an ethyl acetate solution of peracetic acid of a concentration of 36.1 percent containing 12.1 percent acetic acid to the 10th step plate from the bottom and (3) 206.4 parts/hr. of water to the 20th step plate from the bottom. In the steady state operation, the column top temperature was kept at 27° C. and the still temperature was kept at 65° C. 46.0 parts/hr. of an aqueous solution of 94.5 percent ethyl acetate were distilled out of the top of the column. 267.5 parts/hr. of a bottom product were taken out of the bottom of the column. This still residue was fed to a hydrating reactor, and 6.9 parts/hr. of allyl alcohol were added thereto. The mixture was kept at 70° to 75° C. for 45 minutes in said reactor and it was then taken out of the reactor. The distillation and reaction were carried out continuously for 15 hours to obtain 4,116 parts of crude glycerin solution. 680 parts of an aqueous solution of ethyl acetate were recovered from the top of the column. Upon the analysis of said aqueous solution, the decomposition loss of the ethyl acetate to acetic acid and ethanol was found to be 0.07 percent by weight. Further, upon the analysis of said crude glycerin, it was found that said crude glycerin solution obtained from the hydrating reactor contained 90.3 mol percent glycerin, 2.3 mol percent monoacetin and 0.8 mol percent hydrogen peroxide on the basis of the fed peracetic acid.

EXAMPLE 2

In a distillation column having 32 steps, a reaction and distillation were carried out by maintaining the column top pressure at 150 mm./Hg. and the reflux ratio at 0.3 while continuously feeding (1) 40.0 parts/hr. of a peracetic acid solution consisting of 31.5 percent peracetic acid, 12.3 percent acetic acid and 56.2 percent ethyl acetate and 10.0 parts/hr. of allyl alcohol to the 16th step plate from the bottom and (2) 105.0 parts/hr. of water to the 28th step plate from the bottom. In the steady state operation, the column top temperature was 27° C. and the still temperature was 64° C. 23.7 parts/hr. of an azeotropic mixture of ethyl acetate and water, of an ethyl acetate concentration of 94.5 percent, were recovered from the column top. To 131.3 parts/hr. of the reaction solution taken out of the bottom of the still, 2.4 parts/hr. of allyl alcohol were added and the mixture was fed into a first hydrating reactor kept at 65° C. and then a second hydrating reactor kept at 75° C. and the reaction was completed during a total time period of 1 hour. When the operation was thus continued for 200 hours, 26,740 parts of a crude reaction solution were obtained. It was found from an analysis of the column top distillate that the decomposition loss of the ethyl acetate was 0.35 percent by weight. It was further found that, in the crude solution of glycerin obtained from the second hydrating reactor, there had been produced 88.1 mol percent glycerin, 3.1 mol percent monoacetin and 1.5 mol percent hydrogen peroxide on the basis of the fed peracetic acid.

EXAMPLE 30

(Comparative Example)

For the purpose of comparison, 315 parts of the ethyl acetate solution of peracetic acid used in example 1 and 1,080 parts of water were placed in a three-necked flask and the temperature was adjusted to be 50° C. While this solution was being stirred, 104.3 parts of allyl alcohol were added thereto during 1 hour. During the period, the reaction temperature rose to 60° C. Thereafter, the reaction was continued by maintaining this temperature. When the conversion of the peracetic acid reached 99 percent, the reaction was stopped. Upon analysis of the crude reaction solution, it was found that there had been produced 85.9 mol percent glycerin, 4.1 mol percent monoacetin and 3.7 mol percent hydrogen peroxide on the basis of the fed peracetic acid. It was also found that 6.9 percent of the fed ethyl acetate had been hydrolyzed into acetic acid and ethanol.

EXAMPLE 4

(Comparative Example)

In a distillation column having 25 steps, a distillation was carried out under a reduced column top pressure of 150 mm./Hg. while continuously feeding 84.0 parts/hr. of peracetic acid solution of the same composition as in example 1 and 206.4 parts/hr. of water to the 20th step plate from the bottom and there were recovered an azeotropic mixture of ethyl acetate and water from the column top and an aqueous solution of peracetic acid containing a small amount of acetic acid from the still.

948.8 parts of the aqueous solution of peracetic acid of a concentration of 10.0 percent which were taken out of the still during a 4 hours' period were transferred into a separate reactor and the temperature was adjusted to be 50° C. While this solution was being stirred, 111.3 parts of allyl alcohol were added thereto during 1 hour so as to cause the reaction temperature to be 60° C., when the addition was completed. The reaction was continued further, maintaining this reaction temperature. The reaction was stopped when the conversion of the peracetic acid reached 99 percent on the basis of the peracetic acid fed into the distillation column. From the results of an analysis of the crude reaction solution, it was found that there had been produced 66.1 mol percent glycerin, 3.1 mol percent monoacetin and 17.6 mol percent hydrogen peroxide on the basis of the peracetic acid fed to the distillation column. By analyzing the decomposition and conversion of the peracetic acid to acetic acid or hydrogen peroxide throughout the entire process, it was found that 15.3 percent of the fed peracetic acid had changed or decomposed to hydrogen peroxide and acetic acid and 6.5 percent of them had decomposed to acetic acid and oxygen during the period when the aqueous solution of peracetic acid was recovered from the bottom of the still and further 2.3 percent of the fed peracetic acid had changed to hydrogen peroxide during the period of the hydroxylating reaction.

In the reactor, even when the reaction time was further extended, there did not occur any further reaction between the hydrogen peroxide and allyl alcohol.

The embodiments of the invention in which an exclusive property or privilege is claimed are defined as follows:

1. A method for continuously producing glycerin by the hydroxylation of allyl alcohol, in which the allyl alcohol is reacted with peracetic acid in the absence of catalysts, comprising the steps of feeding lower fatty acid ester solution of peracetic acid and allyl alcohol continuously into a distillation column having plates, simultaneously continuously adding water to the column at a position which is higher than the respective feeding positions of said peracetic acid solution and said allyl alcohol, carrying out a distillation and a reaction in the column, distilling an azeotropic mixture of the lower fatty acid ester and water out of the top of the column and recovering an aqueous solution comprised substantially of glycerin from the bottom of the column.

2. A method as claimed in claim 1, in which said lower fatty acid ester is selected from the group consisting of ethyl acetate and methyl acetate.

3. A method as claimed in claim 1, in which the peracetic acid solution is fed into the column at a substantially middle step of the distillation column, allyl alcohol is fed into the column at a plate which is one to 10 steps below said middle step plate and water is fed into the column at a plate which is 10 to 20 steps above said middle step plate.

4. A method as claimed in claim 1, in which the concentration of the peracetic acid solution is in the range of from about 10–50 percent by weight.

5. A method as claimed in claim 1, in which the allyl alcohol is used in an amount of from about 1 to 1.5 mols to 1 mol of peracetic acid.

6. A method as claimed in claim 1, in which the temperature of the reaction zone in the distillation column below the feeding position of the peracetic acid solution is maintained in a range of about 30°–90° C.

7. A method as claimed in claim 1, in which the aqueous solution recovered from the bottom of the column is further treated through one or more separate reactors in order to complete the reaction to form glycerin.